May 3, 1932. S. DAVID 1,856,909
SECURING DEVICE FOR CLOTHING
Original Filed Oct. 3, 1930
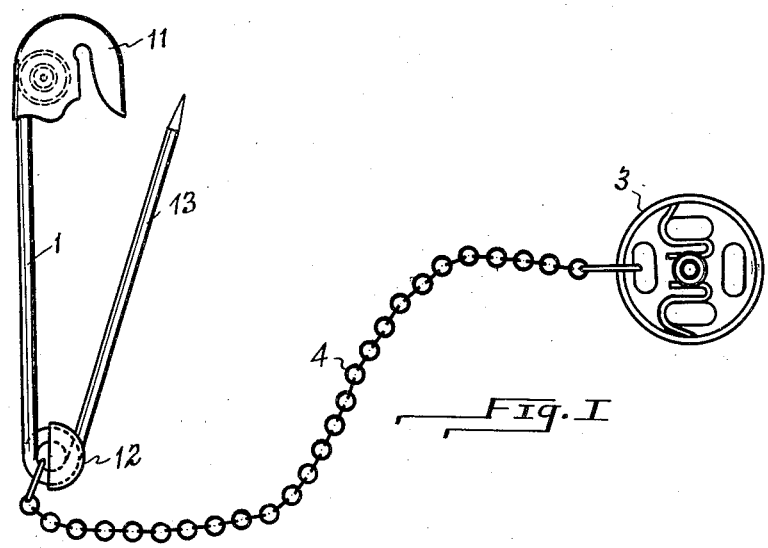
Fig. I
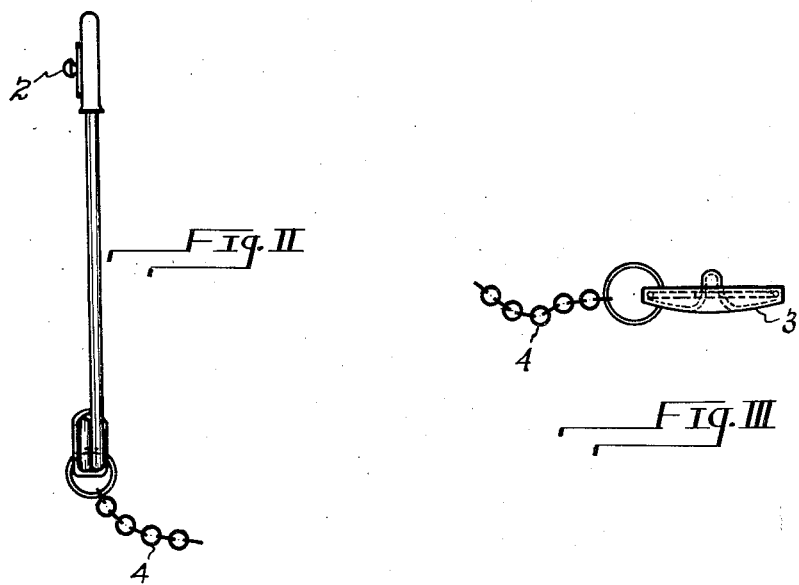
Fig. II
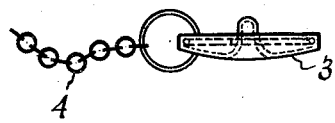
Fig. III
INVENTOR
Sara David
by Christy, Christy and Wharton
her attorneys Patented May 3, 1932

1,856,909

UNITED STATES PATENT OFFICE

SARA DAVID, OF WEST VIEW, PENNSYLVANIA

SECURING DEVICE FOR CLOTHING

Original application filed October 3, 1930, Serial No. 486,114. Divided and this application filed September 2, 1931. Serial No. 560,725.

My invention consists in a securing device for clothing, and is useful particularly in holding an undergarment in place beneath an outer garment. This constitutes a division of my co-pending application, Serial No. 486,114, filed October 3, 1930.

A device embodying the invention is illustrated in the accompanying drawings, in which Fig. I is a view in side elevation; Fig. II is a fragmentary view, showing a portion of the device in elevation, from a point of view at right angles to that of Fig. I; and Fig. III similarly illustrates another portion of the device.

The device includes a safety pin 1, a snap fastener consisting of two parts 2 and 3, and a loop-forming member 4.

The safety pin is essentially the safety pin of familiar construction, and as such is shown in the drawings. The snap fastener is essentially of familiar type, and includes a socket with laterally-yielding rim, and a stud adapted to enter the socket and to be held in place in the socket by the yielding rim. The socket part is the part indicated by the numeral 3, and the stud part is the part indicated by 2. Such parts, ordinarily, are provided with with marginal holes, by which they are sewed to garments. I do not so secure them, and accordingly no such holes are shown. One of the two parts which together constitute this snap fastener may be, and in Figs. I and III is shown to be, connected to and integrated with the safety pin 1.

The loop-forming member 4 consists of a suitable length of flexible material. In this instance I show it to be formed of a chain, and in the particular embodiment which I have used this is a chain of sixteen links to the inch. This loop-forming member is at one end secured to the safety pin 1, and at the other end it is secured to the socket part of the snap fastener.

The safety pin is of usual construction, and includes a bar, to which the numeral 1 is immediately applied, and to this bar, at one end, the pointed shank 13 is pivoted. This pivoting is ordinarily effected by making bar and shank of one length of wire, coiled to a spiral midway its length. The opposite end of the bar as formed is provided with a keeper 11, within which the pointed end of shank 13 may be brought and retained by the spring tension of the spiral coil alluded to. The bar 1 and the shank 13 swing angularly in their common plane. The loop-forming member 4 is linked to the coil alluded to, and a hood 12 may be provided, and welded to the structure, to keep the coil from spreading. One of the two parts of the snap fastener, in this instance the stud part 2, is rigidly secured to the bar 1 of the safety pin and at the end of the bar opposite to the coil; and it is so secured that the axis of the snap fastener, the line of stress in which the parts of the fastener are assembled and separated, is perpendicular to the plane in which the bar and shank of the pin lie and swing. From this particular arrangement several advantages spring. One is that, when the device is applied, the otherwise flexible loop, formed by chain 4, includes a rigid element, namely, the body of the pin itself. This rigid element in the otherwise flexible loop prevents objectionable crushing and crumpling of fabrics secured. Another advantage is that the strains of opening and closing of the snap fastener are exerted in a direction in which the safety-pin structure is rigid and unyielding. Facility in use is not disturbed nor diminished by a yielding of parts, which, in one plane, is an essential characteristic of a safety pin.

The device is primarily intended for securing in place beneath an outer garment the shoulder straps of an undergarment of women's wear. In use, the safety pin may be pinned to the outer garment, and this will ordinarily be done through the shoulder seam and from the inside, so that the body of the safety pin remains quite invisible on the outside. The chain is then looped about the shoulder strap of the undergarment, and the parts of the snap fastener are snapped together. When the shoulder strap of the undergarment has so been looped within the loop-forming member of the device, it is held against slipping down in an objectionable way. It is not necessary to unpin the device in undressing; it is sufficient merely to open the snap fastener. If the outer garment is a washable garment, the whole device may be removed by unpinning it before the article goes to the wash. I do not limit myself to particular dimensions, but in an embodiment of the invention which I have employed with success, the safety pin is ¾ of an inch long, and the chain is 3 inches long and is of about sixteen links to the inch.

I claim as my invention:

A securing device for clothing including in combination a safety pin, a snap fastener, and a loop-forming member, one part of the snap fastener being secured to the safety pin with its axis disposed perpendicularly to the plane in which the parts of the safety pin swing, and the loop-forming member being attached at one end to the safety pin and at the other end to the other part of the snap fastener.

In testimony whereof I have hereunto set my hand.

SARA DAVID.